United States Patent [19]

Kizer

[11] Patent Number: 5,236,000
[45] Date of Patent: Aug. 17, 1993

[54] IN-TANK FUEL SUPPLY SYSTEM AND METHOD OF INSTALLATION

[76] Inventor: Thomas L. Kizer, 32705 Biddestone, Farmington Hills, Mich. 48334

[21] Appl. No.: 956,946

[22] Filed: Oct. 5, 1992

[51] Int. Cl.⁵ .............................................. F17C 13/00
[52] U.S. Cl. ..................................... 137/38; 137/399; 137/590
[58] Field of Search ............... 137/111, 113, 114, 590, 137/38, 399

[56] References Cited

U.S. PATENT DOCUMENTS

| | | | |
|---|---|---|---|
| 2,202,308 | 5/1940 | Buckley | 137/590 X |
| 2,324,464 | 7/1943 | Parker | 137/38 |
| 2,446,384 | 8/1948 | Murdock | 137/590 X |
| 2,831,490 | 4/1958 | Simcock | 137/38 |
| 4,252,140 | 2/1981 | Hildebrandt | 137/38 |
| 4,305,416 | 12/1981 | Henning et al. | 137/590 X |

FOREIGN PATENT DOCUMENTS 466335  5/1937  United Kingdom .................. 137/38

Primary Examiner—Stephen M. Hepperle
Attorney, Agent, or Firm—Kenneth H. MacLean

[57] ABSTRACT

An in-take fuel supply system for a fuel tank that tilts in service comprising a manifold and a plurality of suction pipes that are pivotally attached to inlet ports of the manifold. Each suction pipe extends outwardly of the manifold and has a float valve at the remote end for closing the suction pipe in the absence of sufficient fuel to prevent ingestion of significant amounts of air and vapor. The suction pipes are biased to a horizontal position by springs that allow a fold down configuration for installing the fuel supply system in a fuel tank through a small installation hole.

4 Claims, 3 Drawing Sheets

IN-TANK FUEL SUPPLY SYSTEM AND METHOD OF INSTALLATION

BACKGROUND OF THE INVENTION

This invention relates generally to fuel supply systems and more particularly to fuel supply systems for automotive vehicles that are installed in a fuel tank that tilts during vehicle operation.

The packaging constraints of modern passenger vehicles require shallow, large platform fuel tanks. Fuel sending units which may include a fuel pump, are located in these fuel tanks for optimal packaging rather than for optimal fuel pickup at all tank attitudes. Consequently, there is a need to maintain fuel in the vicinity of the fuel sending unit at low fuel levels when the fuel tank tilts as a result of vehicle maneuvers and unlevel attitudes. Traditionally, this need has been met by providing a small reservoir inside the fuel tank that contains the fuel pickup of the fuel sending unit. The reservoir fills to the nominal fuel level in the fuel tank when the fuel tank is level and keeps a quantity of fuel in the vicinity of the fuel pickup when the fuel tank tilts and the fuel outside the reservoir flows away from the fuel pickup.

This reservoir may attached to the bottom of the fuel tank or it may be attached to the fuel pickup portion of the fuel sending unit. The quantity of fuel retained in the reservoir is necessarily small when the reservoir is attached to the fuel pickup due to the sending unit access hole size. Since the quantity of retained fuel is small, the time of vehicle operation before running out of fuel is limited especially when operating the vehicle on grades.

A large reservoir can be attached to the bottom of the fuel tank to retain more fuel and provide a longer operating time when the fuel tank is tilted. However, installation of a larger reservoir requires either a two piece fuel tank or a very large access hole and means to attach the reservoir to the bottom of the tank.

The tank capacity for a given packaging space is optimized by using a one-piece, blow-molded, contoured fuel tank of thermoplastic material. Thus the use of a two-piece fuel tank is not desirable because it sacrifices tank capacity and further because it costs more to manufacture. On the other hand, a large access hole is difficult and expensive to seal. Thus a larger reservoir attached to the bottom of the fuel tank also leaves something to be desired.

It has also been proposed to accommodate fuel tank tilt by providing conduits inside the fuel tank that lead from peripheral locations in the fuel tank to a selector valve that is inside the fuel tank. See for instance U.S. Pat. No. 2,239,098 issued to Frank B. Hunter Apr. 22, 1941; U.S. Pat. No. 2,831,490 issued to William Harold Simcock Apr. 22, 1958; U.S. Pat. No. 2,934,077 issued to James Clifford Whiting Apr. 26, 1960 and U.S. Pat. No. 4,878,511 issued to Clarence D. Fox Nov. 7, 1989.

However, the fuel supply systems disclosed in these patents pick up fuel at only two remote locations near the bottom of the fuel tank that are on opposite sides of the fuel tank. Consequently these fuel supply systems can only accommodate fuel tank tilt about one horizontal axis, such as tilt fore and aft about a lateral or y-axis. Moreover, these patents do not disclose any feasible method for assembling the fuel supply system inside a one-piece fuel tank.

SUMMARY OF THE INVENTION

The object of this invention is to provide an improved in-tank fuel supply system.

A feature of the improved in-tank fuel supply system of this invention is that the system does not limit operation of the vehicle by the amount of fuel that can be stored in a reservoir.

Another feature of the improved in-tank fuel supply system of this invention is that the system can be used with a one-piece, blow molded, contoured fuel tank of thermoplastic material.

Another feature of the improved in-tank fuel supply system of this invention is that the system can be installed in the fuel tank through a small installation hole.

Still another feature of the improved in-tank fuel supply system of this invention is that the system can pick up fuel at more than two remote locations near the bottom of the fuel tank.

Yet another feature of the improved in-tank fuel supply system of this invention is that the system can accommodate fuel tank tilt about two horizontal axes, such as tilt fore and aft about a lateral or y-axis, and tilt side-to-side about a longitudinal or x-axis.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
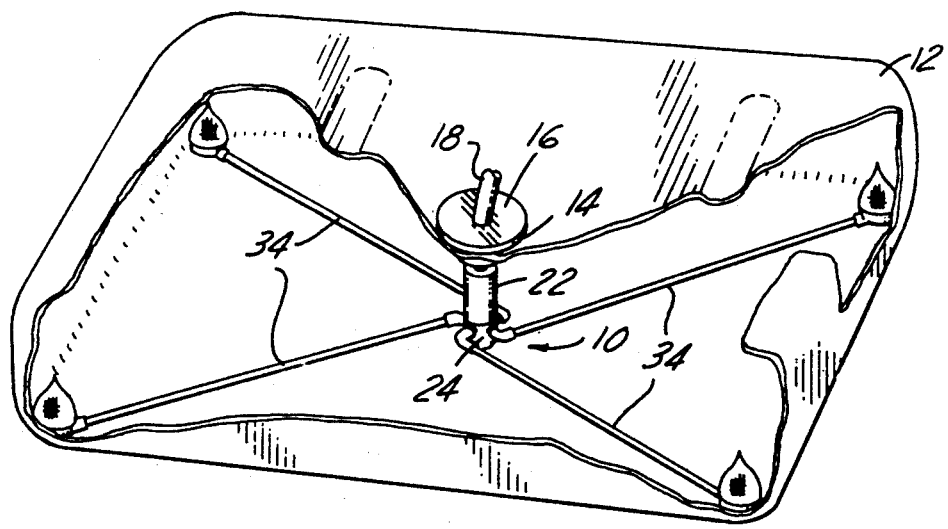
FIG. 1 is a perspective, partially sectioned, schematic view of a fuel tank equipped with an improved fuel supply system of this invention.

Referring now to the drawing and more particularly to FIG. 1, the improved fuel supply system of this invention, indicated generally at 10, is disposed inside a fuel tank 12 of one piece construction that may be blow molded of a fuel resistent thermoplastic material, such as polyethylene. The top of the fuel tank 12 has a small installation hole 14 for installing the fuel supply system 10 inside the fuel tank 12. The installation hole 14 is closed and sealed by a cover 16 that has a pass through fuel tube 18 that is attached to a fuel outlet 20 of a fuel sending device 22 that is inside the fuel tank 12 as part of the fuel supply system. The exterior end of the fuel conduit 18 is attached to the exterior fuel supply system leading to the internal combustion engine of the vehicle (not shown).

The cover 18 is attached to the tank by fasteners and is sealed by using O-rings.

Figure 5:
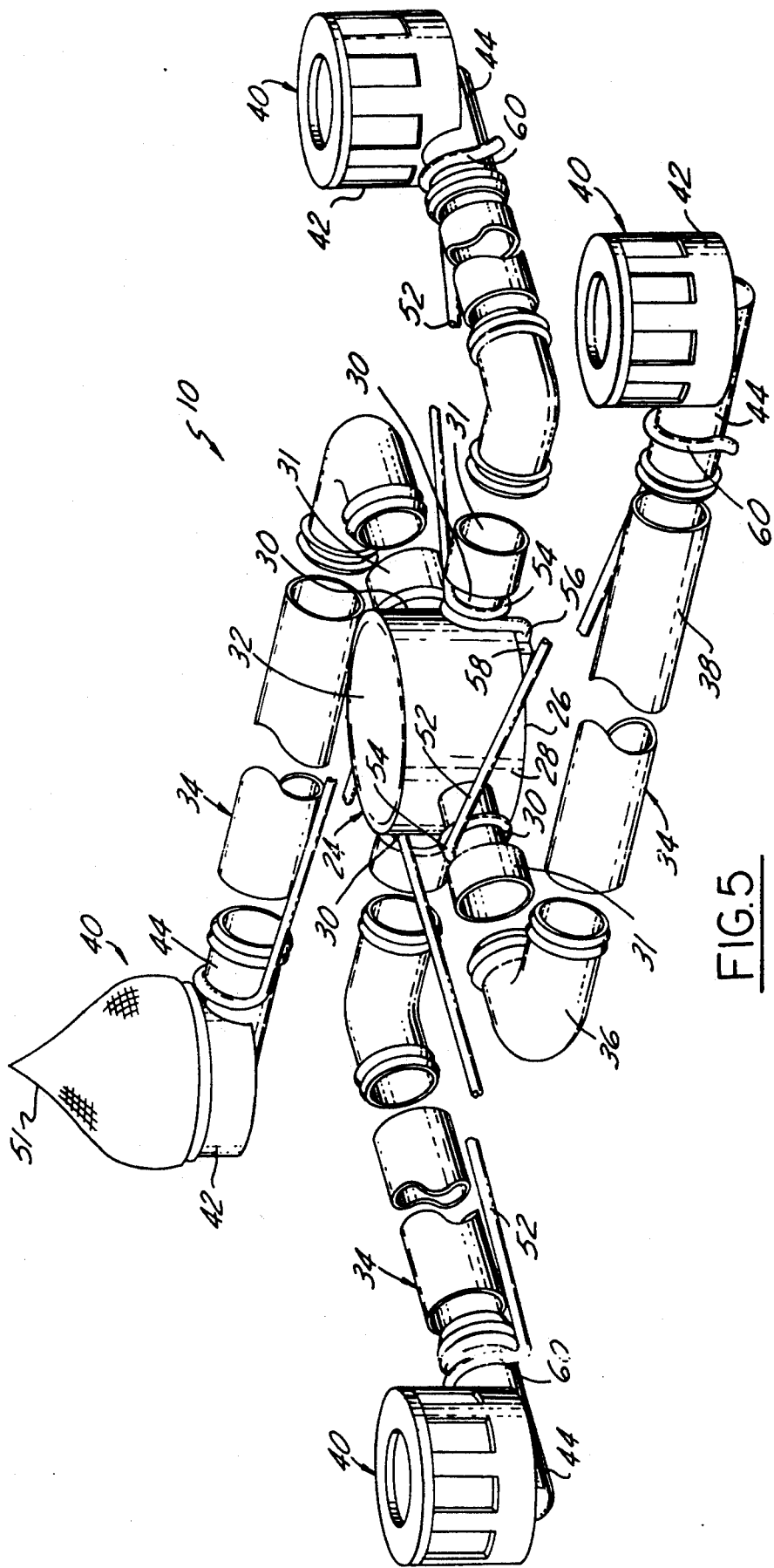
FIG. 5 is a perspective view of the fuel supply system that is shown schematically in FIG. 1.

Referring now to FIG. 5, the fuel supply system 10 comprises a fuel manifold 24 that is cylindrically shaped and made of a relatively rigid, fuel resistent plastic, such as nylon. It has a bottom wall 26 for supporting the manifold 24 on the bottom of the fuel tank 12, and a circular side wall 28. The circular side wall 28 has four equally circumferentially spaced, radially oriented inlet ports 30 comprising short integrally formed pipes that have enlarged end collars 31. The fuel manifold 24 has an open top 32 that serves as an outlet port and that is adapted to connect onto the bottom of the fuel delivery device 22.

Figure 4:
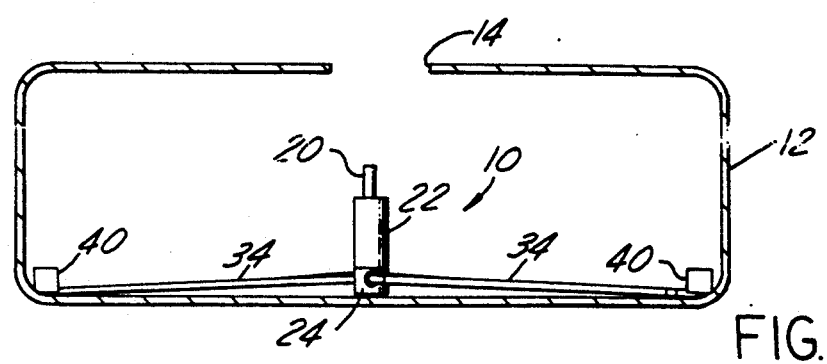

A suction pipe 34 is attached to each inlet port 30 so that it extends outwardly from the fuel manifold 24 and adjacent the bottom of the fuel tank 12 to deliver fuel to the manifold 12 from a near bottom location in the fuel tank 12 that is remote from the fuel manifold 24 as shown in FIGS. 1, 4 and 5.

The four suction pipes 34 preferably extend to the four corners of the fuel tank 12 as shown in FIG. 1. This arrangement not only accommodates fuel tank tilt about two horizontal axes, that is, tilt fore and aft about a lateral (y) axis as well as tilt side-to-side about a longitudinal (x) axis but also accommodates the worst tilt condition where fuel migrates to one corner of the fuel tank 12.

Each suction pipe 34 comprises an inboard, right angle elbow 36 that has circular barbs at each end. One end is inserted into the enlarged collar 31 of its associated inlet port 30 so that it pivots about the centerline of the associated inlet port 30. Expansion tub means (not shown) secure parts 31, 36 axially together.

Each suction pipe 34 further comprises an elongated thermoplastic tube 38 that is attached to the barbed outboard end of the elbow 36 and a float valve 40 at the outboard end of the thermoplastic tube 38 for closing the end of the suction pipe 34 in the absence of sufficient fuel to prevent the suction of significant amounts of air and vapors into the fuel supply system.

Figure 6:
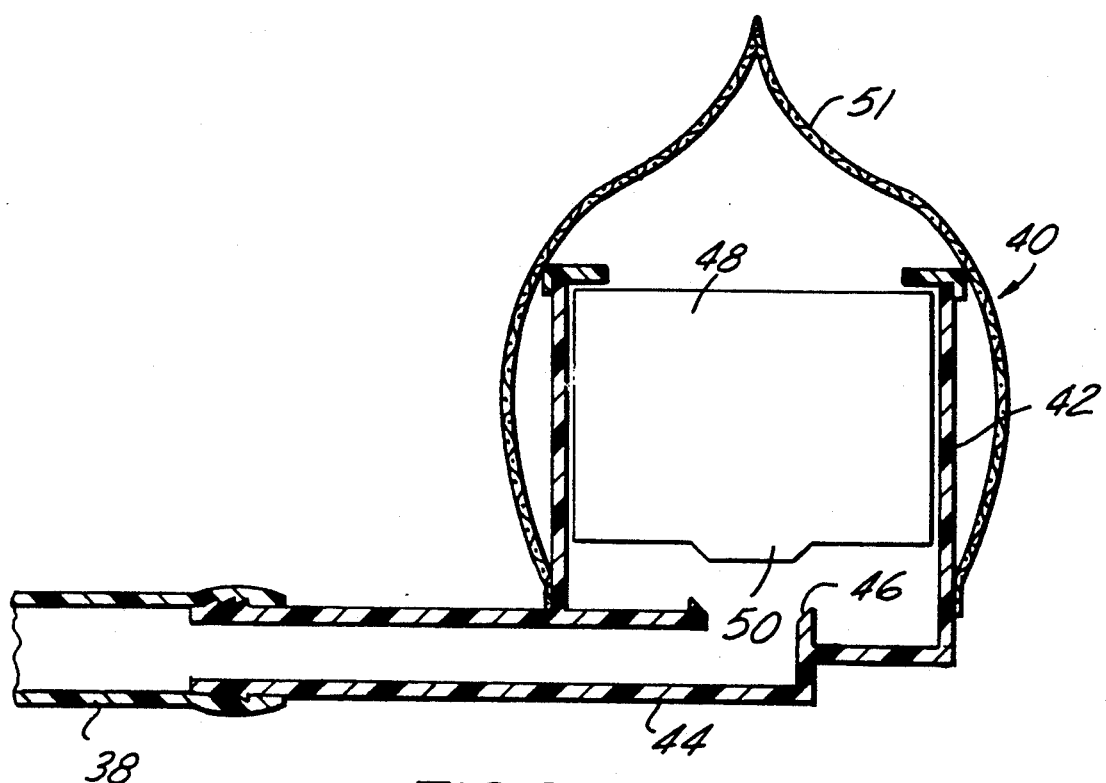
FIG. 6 is a longitudinal, section of a portion of the fuel supply system that is shown in FIG. 5.

Each float valve 40 comprises a round cage 42 that is integrally formed with an outlet pipe 44 that forms an internal valve seat 46 as shown in FIG. 6. A float 48 is disposed inside the cage 42 so that it rises and falls in the cage in response to the level of liquid around the cage.

The bottom of the float 48 has a plug 50 that seats on the valve seat 46 and closes the outboard end of the suction pipe 34 when the fuel level at the float 48 falls below a predetermined value, that is when the fuel level does not provide a buoyant force that is sufficient to lift the float 48 off of the valve seat 46. Under these conditions, the weight or gravitational force of the float 48 holds the plug 50 against the valve seat 46 which prevents air and vapor flow into the suction pipe 34. If the fuel level at the float valve 40 is sufficient to begin to submerge the float 48, the buoyant force acting on the float 48 lifts the plug 50 away from the seat allowing fuel to flow into its associated suction pipe 34. Each float valve 40 is designed to provide the total fuel flow demand of the vehicle fuel system so that normal vehicle operation occurs if only one float valve is submerged.

The end of the outlet pipe 44 has circular barbs for holding the end of the outlet pipe 44 inside the end of the thermoplastic pipe 38 as shown in FIG. 6. Each float valve 40 may also include a mesh filter bag 51 that envelopes the upper flow through portion of the cage 42 and that is heat bonded or otherwise suitably attached to the cage 42 below the flow through portion. FIG. 5 shows only one mesh filter bag 51 in the interests of clarity. However, it should be understood that each float valve 40 may be equipped with a mesh filter bag 51.

Figure 2:
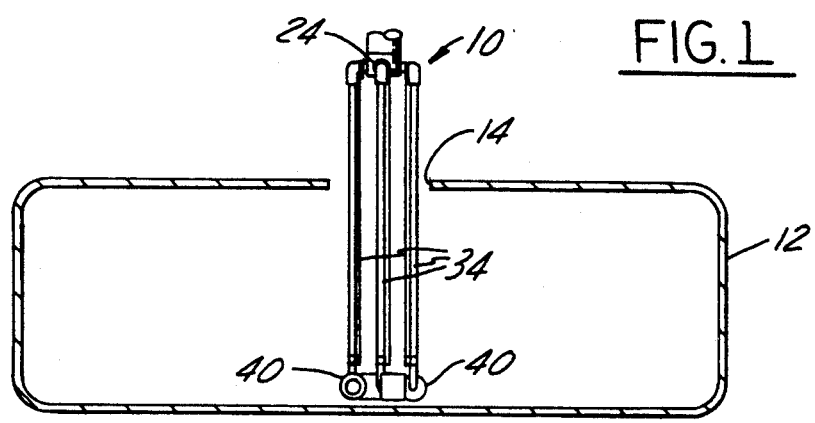
FIGS. 2, 3 and 4 are transverse sections of the fuel tank showing the improved fuel supply system of this invention during various stages of installation.

The in-tank fuel supply system also includes four identical springs 52 that are operatively associated with the fuel manifold 24 and the respective suction pipes 34 for holding each suction pipe 34 in a generally horizontal position so that the remote ends of the suction pipes 34 rest on the bottom of the fuel tank 12 as shown in FIGS. 1, 4 and 5. Each spring 52 has a coiled end 54 that wraps around the inlet 30 inwardly of the enlarged collar 31 which retains the coiled end 54 on the inlet 30. The coiled end 54 has a perpendicular tail 56 that engages a reaction tab 58 on the bottom of the fuel manifold 24. The opposite end of the spring 52 has a hook 60 that snaps over the outlet pipe 44 of the float valve 40 that forms part of the fuel suction pipe 34. Thus the springs 52 hold the fuel suction pipes 34 in the generally horizontal position as shown in FIGS. 1, 4 and 5. The fuel suction pipes 34, however may be pivoted downwardly against the biases of the spring 52 from the horizontal position shown in FIGS. 1, 4 and 5 to adjacent vertical positions that are shown in FIG. 2. This fold down feature permits installation of the improved fuel supply system of this invention into a one-piece fuel tank through a small installation hole as shown in FIGS. 2, 3 and 4.

More specifically, the four suction pipes 34 are pivoted downwardly into vertical positions shown in FIG. 2 and held in this fold down configuration by collaring the four suction pipes 34 manually or with mechanical assistance near the fuel manifold 24. This fold down configuration is then inserted into the fuel tank 12 until the float valves 40 are near the bottom of the tank as shown in FIG. 2.

Figure 3:
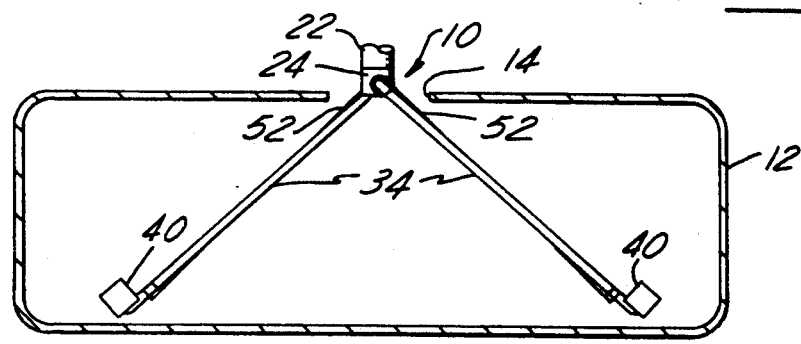

The four suction pipes 34 are then released so that the springs 52 pivot the float valves 40 outwardly and upwardly as shown in FIG. 3. This action lowers the fuel manifold 24 and the fuel delivery device 22 that is attached to it into the fuel tank 12 until the float valves 40 and fuel manifold 24 rest on the bottom as shown in FIGS. 1 and 4.

The small installation hole 14 is then closed and sealed by cover 16 with the fuel tube 18 being connected to the fuel outlet 20 during the process.

The improved fuel supply system of this invention permits the use of virtually any tank configuration, minimizes the quantity of unusable fuel when the fuel tank is tilted due to vehicle attitudes or maneuvers, precludes the necessity of installing reservoirs inside the fuel tank, can be installed through a small installation hole for good fuel tank sealing, and uses standardized components for many fuel tank configurations and sending unit locations because only the spring wire and hose change lengths.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An in-tank fuel supply system for a low profile, vehicular fuel tank that tilts in service comprising;
   a manifold having a bottom wall for supporting the manifold on the bottom of a fuel tank, and a side wall having a plurality of circumferentially spaced, radially oriented inlet ports, and a top wall that has an outlet port and that is adapted to support a fuel delivery device, a plurality of suction pipes having elbows at one end that are pivotally attached to the respective inlet ports and that extend outwardly from the manifold for delivering fuel to the manifold from locations in the tank that are remote from the manifold, each of the suction pipes having a float valve at the opposite end for closing the opposite end in the absence of sufficent fuel to prevent the suction of significant amounts of air and vapors into the fuel supply system, and a plurality of springs operatively associated with the manifold and the respective suction pipes for holding the suction pipes in a generally horizontal position so that the float valves are adjacent the bottom of the fuel tank.

2. The in-tank fuel supply system for a vehicular fuel tank that tilts in service as defined in claim 1 wherein the manifold has four inlet ports and four suction pipes that extend to locations near the respective corners of a rectangular fuel tank in which the fuel supply system is located.

3. The in-tank fuel supply system for a vehicular fuel tank that tilts in service as defined in claim 2 wherein the suction pipes pivot downwardly into adjacent vertical positions against the biases of the springs to facilitate installation of the in-tank fuel supply system in a fuel tank through a small installation hole in the top of the fuel tank.

4. An in-tank fuel supply for a vehicular fuel tank that tilts in service comprising;

a manifold having a bottom wall for supporting the manifold on the bottom of a fuel tank, and a side wall having a plurality of circumferentially spaced, radially oriented inlet ports, and a top wall that has an outlet port, a plurality of suction pipes that are attached to the respective inlet ports at one end and that extend outwardly from the manifold and adjacent the bottom of the fuel tank for delivering fuel to the manifold from near bottom locations in the tank that are remote from the manifold, and wherein the suction pipes have elbows at the one end that are pivotally attached to the inlet ports so that the float valves rest on the bottom of the fuel tank;

each of the suction pipes having a float valve at the opposite end for closing the opposite end in the absence of sufficient fuel to prevent the suction of significant amounts of air and vapors into the fuel supply system.

* * * * *

UNITED STATES PATENT AND TRADEMARK OFFICE
CERTIFICATE OF CORRECTION

PATENT NO. : 5,236,000
DATED : August 17, 1993
INVENTOR(S) : T. Kizor

It is certified that error appears in the above-indentified patent and that said Letters Patent is hereby corrected as shown below:

ON THE TITLE PAGE, in Assignee block #73, insert --Chrysler Corporation--

Signed and Sealed this

Twenty-first Day of June, 1994

*Attest:*

BRUCE LEHMAN

*Attesting Officer*    *Commissioner of Patents and Trademarks*